(12) United States Patent
Kojima et al.

(10) Patent No.: US 9,444,187 B2
(45) Date of Patent: Sep. 13, 2016

(54) VEHICLE

(71) Applicants: Koichi Kojima, Toyota (JP); Tomokazu Masuda, Kasugai (JP); Yamato Niwa, Toyota (JP); Tomohiro Inoue, Konan (JP)

(72) Inventors: Koichi Kojima, Toyota (JP); Tomokazu Masuda, Kasugai (JP); Yamato Niwa, Toyota (JP); Tomohiro Inoue, Konan (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 0 days.

(21) Appl. No.: 14/772,683

(22) PCT Filed: Apr. 15, 2013

(86) PCT No.: PCT/JP2013/061156
§ 371 (c)(1),
(2) Date: Sep. 3, 2015

(87) PCT Pub. No.: WO2014/170937
PCT Pub. Date: Oct. 23, 2014

(65) Prior Publication Data
US 2016/0028187 A1   Jan. 28, 2016

(51) Int. Cl.
*H01R 13/62* (2006.01)
*H01R 13/639* (2006.01)
*B60L 11/12* (2006.01)
*B60L 11/18* (2006.01)
(Continued)

(52) U.S. Cl.
CPC ............ *H01R 13/639* (2013.01); *B60L 11/123* (2013.01); *B60L 11/1818* (2013.01); *B60L 11/1881* (2013.01); *H01R 13/6397* (2013.01); *H01R 13/5213* (2013.01); *H01R 13/6275* (2013.01); *H01R 2201/26* (2013.01); *Y02T 10/6217* (2013.01); *Y02T 10/7072* (2013.01); *Y02T 10/7077* (2013.01); *Y02T 90/14* (2013.01); *Y02T 90/34* (2013.01)

(58) Field of Classification Search
CPC .. H01R 13/62; H01R 13/639; H01R 13/633; H01R 13/629; H01R 13/44; B60L 11/1818; B60L 11/1816; B60L 11/1824; B60L 2230/12
USPC ................. 439/34, 304, 310, 345, 352, 133; 320/109; 180/65; 70/237
See application file for complete search history.

(56) References Cited

U.S. PATENT DOCUMENTS

| | | | |
|---|---|---|---|
| 5,536,173 A | * | 7/1996 | Fujitani ............... B60L 11/1818 439/321 |
| 5,627,448 A | * | 5/1997 | Okada ...................... B60L 3/12 320/109 |

(Continued)

FOREIGN PATENT DOCUMENTS

| | | |
|---|---|---|
| EP | 2 520 456 A1 | 11/2012 |
| JP | 2000-318450 A | 11/2000 |

(Continued)

Primary Examiner — Gary Paumen
(74) Attorney, Agent, or Firm — Oliff PLC

(57) ABSTRACT

A vehicle includes a connection unit, a lid of the connection unit, one lock unit, another lock unit, and a drive device. The connection unit is configured to connect a power cable. One lock unit is configured to lock connection of the power cable to the connection unit. The other lock unit is configured to lock the lid to a closed state. The drive device is configured to drive both of the lock units to a locked state when at least one of a first condition permitting one lock unit to be locked and a second condition permitting the other lock unit to be locked is established.

7 Claims, 8 Drawing Sheets

(51) Int. Cl.
  *H01R 13/52* (2006.01)
  *H01R 13/627* (2006.01)

(56) References Cited

U.S. PATENT DOCUMENTS

| | | | | |
|---|---|---|---|---|
| 8,172,599 B2* | 5/2012 | Konchan | B60L 11/1818 | 320/108 |
| 8,523,596 B2* | 9/2013 | Inoue | G07C 9/00182 | 439/310 |
| 8,550,833 B2* | 10/2013 | Martin | H01R 13/6395 | 439/310 |
| 8,616,909 B2* | 12/2013 | Kurumizawa | E05B 83/00 | 320/109 |
| 8,647,135 B2* | 2/2014 | Kurumizawa | E05B 83/28 | 439/304 |
| 8,753,136 B2* | 6/2014 | Hirashita | B60L 11/1818 | 439/304 |
| 2002/0060303 A1 | 5/2002 | Yonekawa | | |
| 2009/0082916 A1 | 3/2009 | Tanaka | | |
| 2011/0287649 A1* | 11/2011 | Kurumizawa | B60L 11/1818 | 439/304 |
| 2011/0300733 A1* | 12/2011 | Janarthanam | B60L 11/1818 | 439/304 |
| 2012/0238122 A1* | 9/2012 | Hirashita | B60L 11/1818 | 439/304 |
| 2013/0015951 A1 | 1/2013 | Kuramochi et al. | | |
| 2013/0089999 A1* | 4/2013 | Martin | H01R 13/6395 | 439/345 |
| 2013/0137286 A1* | 5/2013 | Smith | E05B 47/026 | 439/304 |
| 2013/0252448 A1* | 9/2013 | Schulte | H01R 13/6397 | 439/304 |

FOREIGN PATENT DOCUMENTS

| | | |
|---|---|---|
| JP | 2002-156717 A | 5/2002 |
| JP | 2009-081917 A | 4/2009 |
| JP | 2012-205361 A | 10/2012 |

* cited by examiner

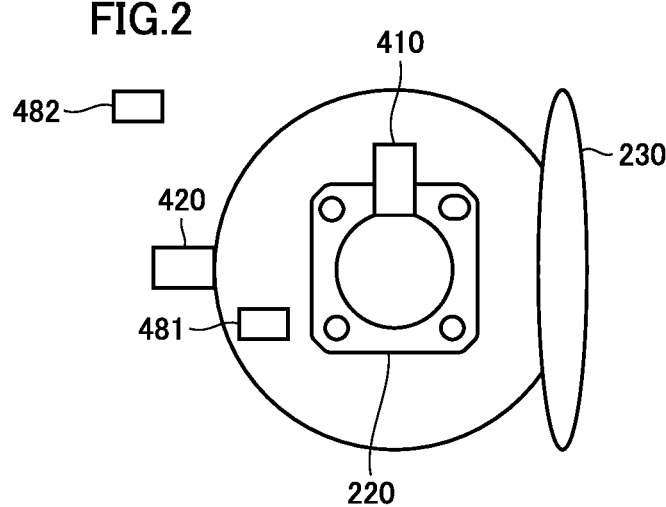
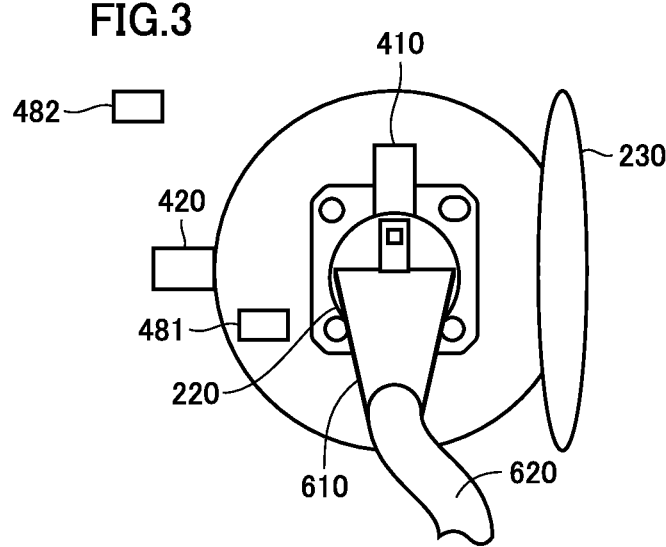

VEHICLE

TECHNICAL FIELD

The present invention relates to a vehicle and more specifically to a vehicle configured to be electrically connectable via a power cable to electronics external to the vehicle.

BACKGROUND ART

Japanese Patent Laying-Open No. 2009-081917 (PTD 1) discloses a charging system for charging a travelling battery mounted in a vehicle. This charging system includes a connector lock unit locking a cable connector of a charging cable to a receptacle of a vehicle, and a cover lock unit locking a cover externally covering the receptacle of the vehicle.

CITATION LIST

Patent Documents

PTD 1: Japanese Patent Laying-Open No. 2009-081917
PTD 2: Japanese Patent Laying-Open No. 2012-205361

SUMMARY OF INVENTION

Technical Problem

The charging system as described above has the connector lock unit operated independently of the cover lock unit and accordingly, the charging system is provided with a drive device for driving the connector lock unit and a drive device for driving the cover lock unit, discretely. This results in the charge system having a complicated configuration and hence being costly.

Accordingly, the present invention contemplates simplifying a drive device for driving a lock unit to achieve a reduced cost.

Solution to Problem

The present invention provides a vehicle comprising a connection unit, a lid, a first lock unit, a second lock unit, and a drive device. The connection unit is configured to allow a power cable to be connected thereto. The lid is a lid of the connection unit. The first lock unit is configured to lock connection between the connection unit and the power cable. The second lock unit is configured to lock the lid to a closed state. The drive device is configured to drive both the first and second lock units to a locked state when at least one of a first condition permitting the first lock unit to be locked and a second condition permitting the second lock unit to be locked is established.

Preferably, the drive device includes a first actuator, a second actuator, and a drive circuit. The first actuator is configured to operate the first lock unit. The second actuator is configured to operate the second lock unit. The drive circuit is configured to drive the first and second actuators.

Preferably, the first and second lock units are configured to be mechanically ganged. The drive device includes an actuator configured to operate the first and second lock units, and a drive circuit configured to drive the actuator.

Preferably the vehicle further comprises a first operation unit and a second operation unit. The first operation unit is configured to allow a user to operate the first lock unit. The second operation unit is configured to allow the user to operate the second lock unit. The first condition is established when the power cable is connected to the connection unit, the first lock unit is unlocked and the first operation unit is operated. The second condition is established when the power cable is disconnected from the connection unit, the lid is in the closed state, the second lock unit is unlocked, and the second operation unit is operated.

Preferably, the drive device is configured to drive both the first and second lock units to an unlocked state when at least one of a third condition allowing the first lock unit to be unlocked and a fourth condition allowing the second lock unit to be unlocked is established.

Preferably, the vehicle further comprises a first operation unit and a second operation unit. The first operation unit is configured to allow a user to operate the first lock unit. The second operation unit is configured to allow the user to operate the second lock unit. The third condition is established when the power cable is connected to the connection unit, the first lock unit is locked and the first operation unit is operated. The fourth condition is established when the power cable is disconnected from the connection unit, the lid is in the closed state, the second lock unit is locked, and the second operation unit is operated.

Preferably, the vehicle further comprises a third lock unit configured to lock a door of the vehicle to a closed state. The drive device drives the third lock unit when the drive device drives both the first and second lock units. Preferably, the vehicle further comprises a communication device configured to communicate with a communication terminal carried by a user. The drive device drives both the first and second lock units when the communication device detects a signal issued from the communication terminal.

Advantageous Effect of Invention

In the present invention, a drive device drives both first and second lock units to a locked state when at least one of a first condition permitting the first lock unit to be locked and a second condition permitting the second lock unit to be locked is established. This allows the first and second lock units to be driven by a single drive device. The present invention thus allows lock units to be driven by a simplified drive device to achieve a reduced cost.

BRIEF DESCRIPTION OF DRAWINGS

FIG. 2 is a diagram for illustrating a lock unit of a lock device shown in FIG. 1.
FIG. 3 is a diagram for illustrating the lock unit of the lock device shown in FIG. 1.

DESCRIPTION OF EMBODIMENTS

Hereinafter reference will be made to the drawings to describe the present invention in embodiments. In the figures, identical or corresponding components are identically denoted and will not be described repeatedly.

First Embodiment

Figure 1:
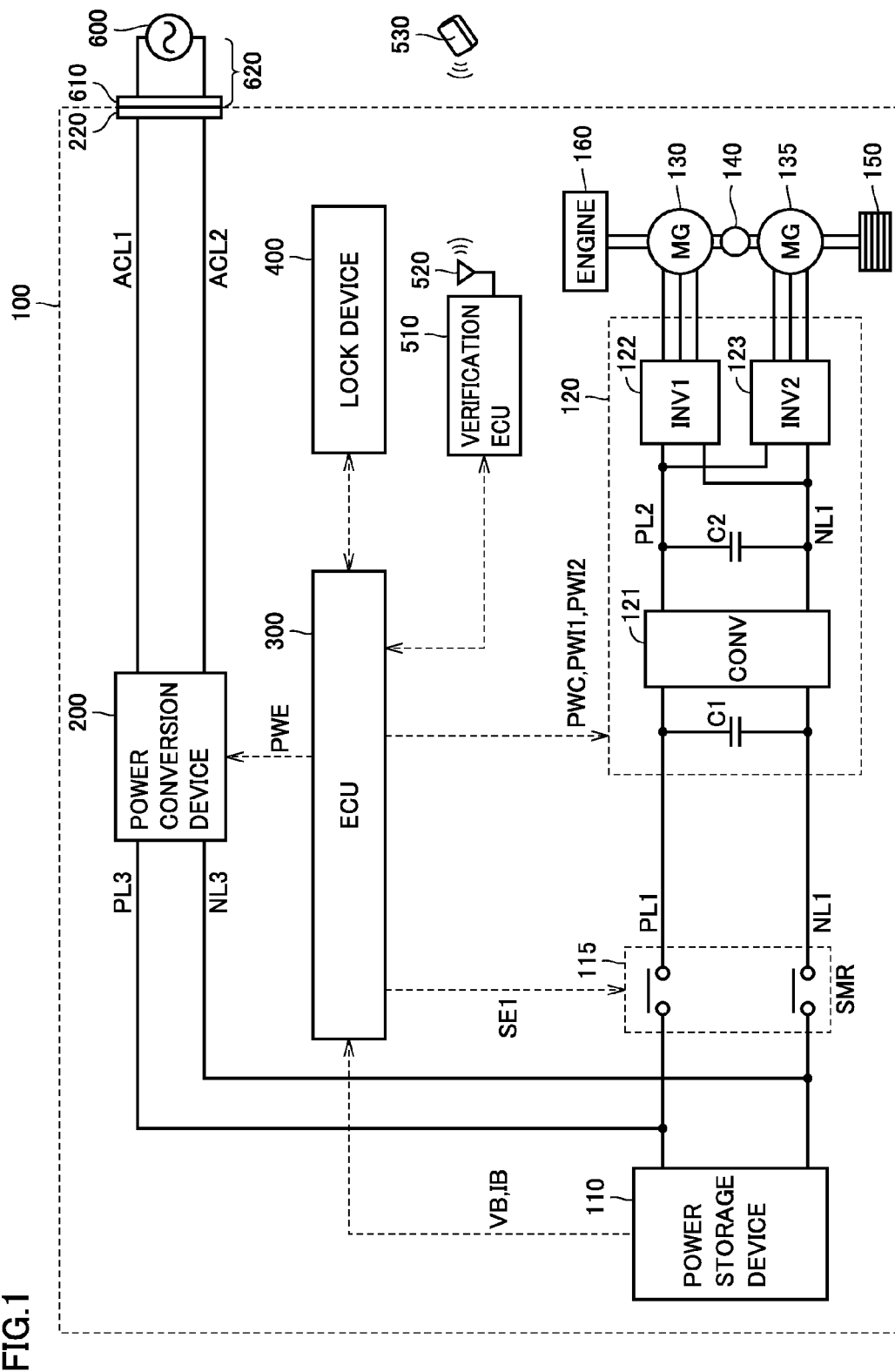
FIG. 1 is a block diagram generally showing a vehicle according to a first embodiment.

FIG. 1 is a block diagram generally showing a vehicle according to a first embodiment. With reference to FIG. 1, a vehicle 100 includes a power storage device 110, a system main relay (SMR) 115, a power control unit (PCU) 120, motor generators 130, 135, a driving power transmission gear 140, driving wheels 150, an engine 160, a control device (hereinafter also referred to as an electronic control unit (ECU)) 300, a verification ECU 510, and a smart antenna 520.

Power storage device 110 is a chargeably and dischargeably configured electric power storage component. Power storage device 110 for example includes a rechargeable battery such as a lithium ion battery, a nickel metal hydride battery or a lead acid battery, or a cell of a power storage element such as an electric double layer capacitor.

Power storage device 110 is connected via SMR 115 to PCU 120 for driving motor generators 130, 135. Power storage device 110 supplies PCU 120 with electric power for generating force to drive vehicle 100. Furthermore, power storage device 110 stores therein electric power generated by motor generators 130, 135. Power storage device 110 outputs 200 V for example.

Power storage device 110 detects a voltage VB and a current IB output from power storage device 110 and outputs them to ECU 300. From output voltage VB and output current IB, ECU 300 calculates SOC indicating a state of charge of power storage device 110.

SMR 115 includes a relay connected to the positive electrode terminal of power storage device 110 and a power line PL1, and a relay connected to the negative electrode terminal of power storage device 110 and a power line NL1. SMR 115 operates in response to a control signal SE1 received from ECU 300 to switch supplying electric power between power storage device 110 and PCU 120 to interrupting electric power therebetween and vice versa.

PCU 120 includes a converter 121, inverters 122, 123, and capacitors C1, C2.

Converter 121 operates in response to a control signal PWC received from ECU 300 to perform voltage conversion between power lines PL1, NL1 and power lines PL2, NL1.

Inverters 122, 123 are connected to power lines PL2, NL1 in parallel. Inverters 122 and 123 operate in response to control signals PWI1 and PWI2 received from ECU 300 to convert direct current (dc) power that is received from converter 121 into alternate current (ac) power to drive motor generators 130 and 135, respectively.

Capacitor C1 is provided between power lines PL1 and NL1 and reduces voltage variation between power lines PL1 and NL1. Furthermore, capacitor C2 is provided between power lines PL2 and NL1 and reduces voltage variation between power lines PL2 and NL1.

Motor generator 130, 135 is an ac rotating electric machine, and for example is a permanent magnet type, synchronous motor including a rotor having a permanent magnet embedded therein.

Motor generators 130, 135 output torque, which is in turn transmitted to driving wheels 150 via driving power transmission gear 140 configured of a speed reducer, a power split device and the like to cause vehicle 100 to travel. When vehicle 100 is braked regeneratively, motor generator 130, 135 can generate electric power by the torque of driving wheels 150. Then, the generated power is converted by PCU 120 into electric power charged to power storage device 110.

Furthermore, motor generators 130, 135 are also coupled with engine 160 via driving power transmission gear 140. A torque output from motor generators 130, 135 and a torque output from engine 160 are cooperatively controlled by ECU 300.

Furthermore, when vehicle 100 is parked, the driving force of engine 160 can be used to cause motor generator 130 to generate electric power. The generated electric power is used to charge power storage device 110.

Verification ECU 510 communicates data with smart key 530 via smart antenna 520 wirelessly. Verification ECU 510 receives data from smart key 530, and compares a code stored in smart key 530 with a code stored in verification ECU 510. Verification ECU 510 thus determines whether smart key 530 corresponds to vehicle 100.

Verification ECU 510 outputs to ECU 300 a signal indicating whether smart key 530 corresponds to vehicle 100. ECU 300 receives the signal from verification ECU 510 and can recognize therefrom whether a user carrying smart key 530 with him/her is present near vehicle 100. Note that verification ECU 510 may communicate with ECU 300 via controller area network (CAN) communication.

Vehicle 100 further includes a power conversion device 200 and a connection unit 220 as a configuration using electric power received from an external power supply 600 external to the vehicle to charge power storage device 110 therewith.

Power conversion device 200 is connected to connection unit 220 via power lines ACL1 and ACL2. Furthermore, power conversion device 200 is connected to power storage device 110 via power lines PL3 and NL3. Power conversion device 200 operates in response to a control signal PWE received from ECU 300 to convert ac power that is supplied from external power supply 600 into dc power which can be used to charge power storage device 110.

Connection unit 220 is provided on the body of vehicle 100. Connected to connection unit 220 is a connector 610 of a power cable 620. Power cable 620 is connected to external power supply 600, and external power supply 600 supplies electric power which is in turn transmitted via connection unit 220 to vehicle 100.

Vehicle 100 further includes a lock device 400.

Figure 4:
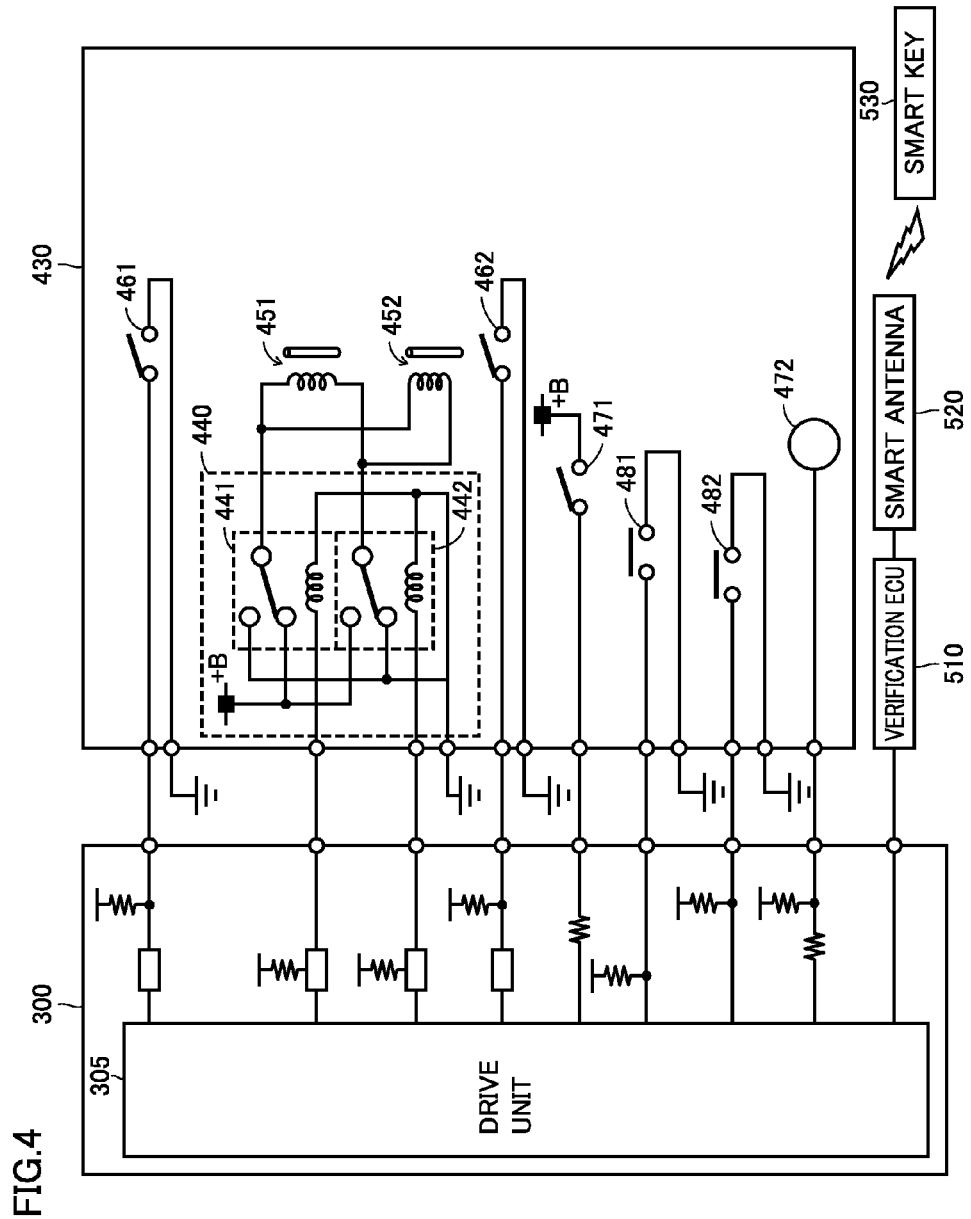
FIG. 4 shows a configuration of a drive device of the lock device shown in FIG. 1.

FIG. 2 and FIG. 3 are diagrams for illustrating a lock unit of lock device 400 shown in FIG. 1. FIG. 2 shows connection unit 220 without power cable 620 connected thereto and FIG. 3 shows connection unit 220 with power cable 620 connected thereto. FIG. 4 shows a configuration of a drive device of lock device 400 shown in FIG. 1.

With reference to FIG. 2 to FIG. 4, lock device 400 includes lock units 410, 420 and a drive device 430.

Lock unit 410 is provided to lock connection between connector 610 of power cable 620 and connection unit 220. Lock unit 410 is configured to provide a locked state, which disallows connector 610 to be removed from connection unit 220, and an unlocked state, which allows connector 610 to be removed from connection unit 220, switchably. As one example, lock unit 410 has a pin that can be engaged with a recess provided in connector 610. The pin has an engaged state and a disengaged state switched as driven by drive device 430. Lock unit 410 thus has the locked state and the unlocked state switched by drive device 430.

Lock unit 420 is provided to lock a lid 230 that externally covers connection unit 220 to a closed state. Lock unit 420 is configured to provide a locked state, which disallows lid 230 to be opened, and an unlocked state, which allows lid 230 to be opened, switchably. As one example, lock unit 420 has a pin that can be engaged with a recess provided in lid 230. The pin has an engaged state and a disengaged state switched as driven by drive device 430. Lock unit 420 thus has the locked state and the unlocked state switched by drive device 430.

Drive device 430 is a device for driving lock units 410, 420. Drive device 430 includes a drive circuit 440, actuators 451, 452, an unlocked state detection switch 461, a locked state detection switch 462, a lid open/closed detection switch 471, a cable connection detection switch 472, a cable lock switch 481, and a lid lock switch 482.

Actuator 451 is an actuator for driving lock unit 410. Actuator 451 is for example a motor and provides a driving force to lock unit 410. Note that actuator 451 may be a solenoid.

Actuator 452 is an actuator for driving lock unit 420. Actuator 452 is for example a motor and provides a driving force to lock unit 420. Note that actuator 452 may be a solenoid.

Drive circuit 440 is a circuit for driving actuators 451, 452. Drive circuit 440 includes relays 441, 442. Relays 441, 442 are connected to a voltage source +B or a ground GND, as switched in response to a signal received from drive unit 305 of ECU 300. Drive circuit 440 is thus switched, in response to the signal received from drive unit 305, from energizing actuators 451, 452 to deenergizing actuators 451, 452 and vice versa and in in what direction actuators 451, 452 are energized.

Herein, actuators 451, 452 are connected to drive circuit 440 in parallel. Drive circuit 440 is thus configured to drive both actuators 451 and 452 simultaneously.

Unlocked state detection switch 461 is a switch for detecting whether lock units 410, 420 are in the unlocked state. Drive unit 305 receives a detection signal from unlocked state detection switch 461. Locked state detection switch 462 is a switch for detecting whether lock units 410, 420 are in the locked state. Drive unit 305 receives a detection signal from locked state detection switch 462.

Lid open/closed detection switch 471 is a switch for detecting whether lid 230 is open. Drive unit 305 receives a detection signal from lid open/closed detection switch 471. Cable connection detection switch 472 is a switch for detecting whether power cable 620 has connector 610 connected to connection unit 220. Drive unit 305 receives a detection signal from cable connection detection switch 472.

Cable lock switch 481 is a switch operated by a user to switch power cable 620 from the locked state to the unlocked state and vice versa. Drive unit 305 receives an operation signal from cable lock switch 481. Lid lock switch 482 is a switch operated by the user to switch lid 230 from the locked state to the unlocked state and vice versa. Drive unit 305 receives an operation signal from lid lock switch 482.

Lock device 400 may further include a door lock unit (not shown) for locking a door of vehicle 100 to the closed state. In that case, drive device 430 is configured to further include a drive circuit and an actuator for driving the door lock unit.

If the above configuration has lock units 410 and 420 driven by different drive devices, respectively, the lock device will have a complicated configuration and hence be costly.

Accordingly in the present embodiment a lock control is performed to drive both lock units 410 and 420 to the locked state when at least one of a first condition permitting lock unit 410 to be locked and a second condition permitting lock unit 420 to be locked is established.

Herein, when the locked state of lock unit 410 is requested, power cable 620 has been connected to connection unit 220, and accordingly, lid 230 is in the open state. In that condition, driving lock units 410, 420 to the locked state simultaneously does not lock lid 230. Furthermore, when the locked state of lock unit 420 is requested, lid 230 has been closed, and accordingly, power cable 620 has been disconnected. In that condition, driving lock units 410, 420 to the locked state simultaneously does not lock power cable 620. Thus, driving lock units 410, 420 to the locked state simultaneously will never impair the user's operability.

This allows lock units 410, 420 to be driven by a single drive device. The lock units can thus be driven via a simplified drive device to achieve a reduced cost.

Figure 5:
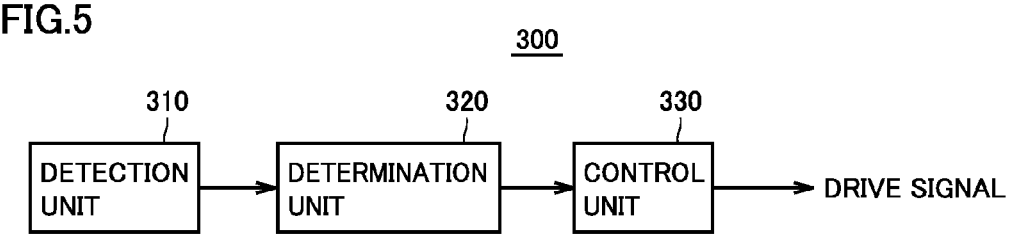
FIG. 5 is a functional block diagram regarding a lock control performed by an ECU shown in FIG. 1.

FIG. 5 is functional block diagram regarding a lock control done by ECU 300 shown in FIG. 1. Each functional block shown in FIG. 5 is implemented by processing done by ECU 300 via hardware or software.

With reference to FIG. 4 and FIG. 5, ECU 300 includes a detection unit 310, a determination unit 320, and a control unit 330.

Detection unit 310 detects whether lock units 410, 420 are locked and what state lid open/closed detection switch 471, cable connection detection switch 472, cable lock switch 481, and lid lock switch 482 each presents, and detection unit 310 outputs a detected result to determination unit 320.

Determination unit 320 receives the result from detection unit 310 and therefrom determines whether the drive device 430 drive circuit 440 should be driven. More specifically, determination unit 320 generates a signal driving both lock units 410 and 420 to the locked state when at least one of the first condition permitting lock unit 410 to be locked and the second condition permitting lock unit 420 to be locked is established.

Herein, the first condition is established when power cable 620 is connected to connection unit 220, lock unit 410 is in the unlocked state and cable lock switch 481 has been operated. The second condition is established when power cable 620 is disconnected from connection unit 220, lid 230 is in the closed state, lock unit 420 is in the unlocked state, and lid lock switch 482 has been operated.

Furthermore, determination unit 320 generates a signal driving both lock units 410 and 420 to the unlocked state when at least one of a third condition allowing lock unit 410 to be unlocked and a fourth condition allowing lock unit 420 to be unlocked is established.

Herein, the third condition is established when power cable 620 is connected to connection unit 220, lock unit 410 is in the locked state and cable lock switch 481 has been operated. The fourth condition is established when power cable 620 is disconnected from connection unit 220, lid 230 is in the closed state, lock unit 420 is in the locked state, and lid lock switch 482 has been operated. Determination unit 320 outputs the generated signal to control unit 330.

Control unit 330 receives the signal from determination unit 320 and in response thereto generates a drive signal for controlling drive circuit 440 and outputs the generated drive signal to drive circuit 440.

Figure 6:
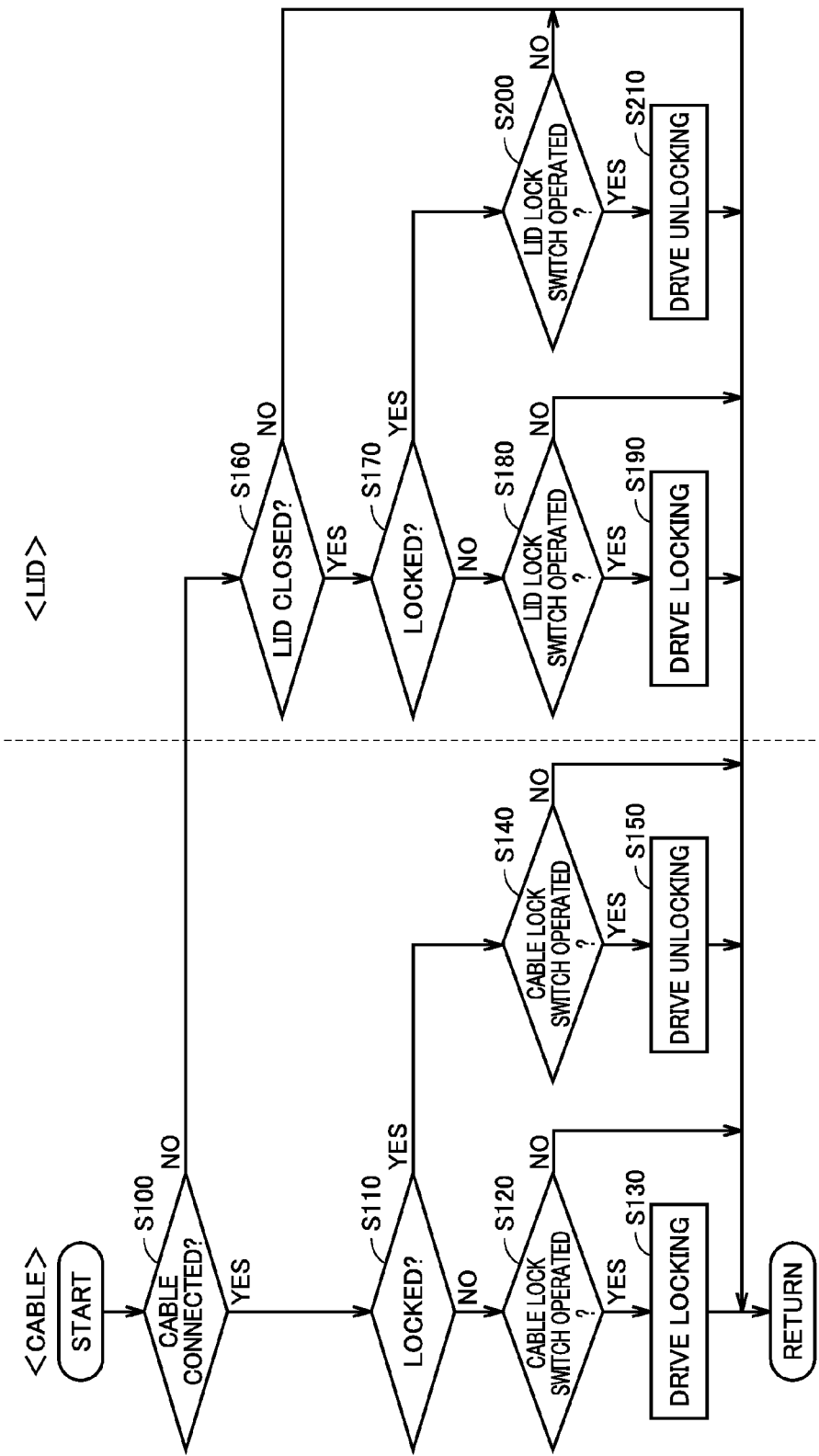
FIG. 6 is a flowchart of a process of a lock control performed by the ECU shown in FIG. 1.

FIG. 6 is a flowchart of a process of a lock control performed by ECU 300 shown in FIG. 1. The FIG. 6 flowchart is implemented by periodically executing a program previously stored in ECU 300. Alternatively, some steps may be performed via constructed dedicated hardware (or electronic circuitry).

With reference to FIG. 4 and FIG. 6, ECU 300 in step (S) 100 determines whether power cable 620 is connected to connection unit 220. When ECU 300 determines that power cable 620 is connected to connection unit 220 (YES in S100) ECU 300 determines whether lock unit 410 is in the locked state (S110).

When ECU 300 determines that lock unit 410 is in the unlocked state (NO in S110) ECU 300 determines whether cable lock switch 481 has been operated (S120). When ECU 300 determines that cable lock switch 481 has not been operated (NO in S120), ECU 300 does not perform the subsequent step(s) and returns to a main routine.

When ECU 300 determines that cable lock switch 481 has been operated (YES in S120), ECU 300 generates a signal driving both lock units 410 and 420 to the locked state, and outputs the generated signal to drive circuit 440 (S130). Power cable 620 is thus locked to connection unit 220.

In S110 when ECU 300 determines that lock unit 410 is in the locked state (YES in 5110) ECU 300 determines whether cable lock switch 481 has been operated (S140). When ECU 300 determines that cable lock switch 481 has not been operated (NO in S140), ECU 300 does not perform the subsequent step(s) and returns to the main routine.

When ECU 300 determines that cable lock switch 481 has been operated (YES in S 140), ECU 300 generates a signal driving both lock units 410 and 420 to the unlocked state, and outputs the generated signal to drive circuit 440 (S150). This unlocks power cable 620 locked to connection unit 220.

In contrast, when ECU 300 determines in S100 that power cable 620 is not connected to connection unit 220 (NO in S100) ECU 300 determines whether lid 230 is in the closed state (S160). When ECU 300 determines that lid 230 is in the closed state (YES in S160) ECU 300 determines whether lock unit 420 is in the locked state (S170).

When ECU 300 determines that lock unit 420 is in the unlocked state (NO in S170) ECU 300 determines whether lid lock switch 482 has been operated (S180). When ECU 300 determines that lid lock switch 482 has not been operated (NO in S180), ECU 300 does not perform the subsequent step(s) and returns to the main routine.

When ECU 300 determines that lid lock switch 482 has been operated (YES in S180), ECU 300 generates a signal driving both lock units 410 and 420 to the locked state, and outputs the generated signal to drive circuit 440 (S190). Lid 230 is thus locked to the closed state.

In S170 when ECU 300 determines that lock unit 420 is in the locked state (YES in S170) ECU 300 determines whether lid lock switch 482 has been operated (S200). When ECU 300 determines that lid lock switch 482 has not been operated (NO in S200), ECU 300 does not perform the subsequent step(s) and returns to the main routine.

When ECU 300 determines that lid lock switch 482 has been operated (YES in S200), ECU 300 generates a signal driving both lock units 410 and 420 to the unlocked state, and outputs the generated signal to drive circuit 440 (S210). Lid 230 is thus unlocked.

In contrast, when ECU 300 determines in S160 that lid 230 is in the open state (NO in S160), ECU 300 does not perform the subsequent step(s) and returns to the main routine.

Thus in the first embodiment drive device 430 drives both lock units 410 and 420 to the locked state when at least one of the first condition permitting lock unit 410 to be locked and the second condition permitting lock unit 420 to be locked is established. This allows lock units 410, 420 to be driven by drive device 430 that is a single drive device. The first embodiment thus allows lock units 410, 420 to be driven via drive device 430 that is simplified to achieve a reduced cost.

Second Embodiment

A second embodiment will be described for an example with a door lock unit operating as lock units 410, 420 operate.

Figure 7:
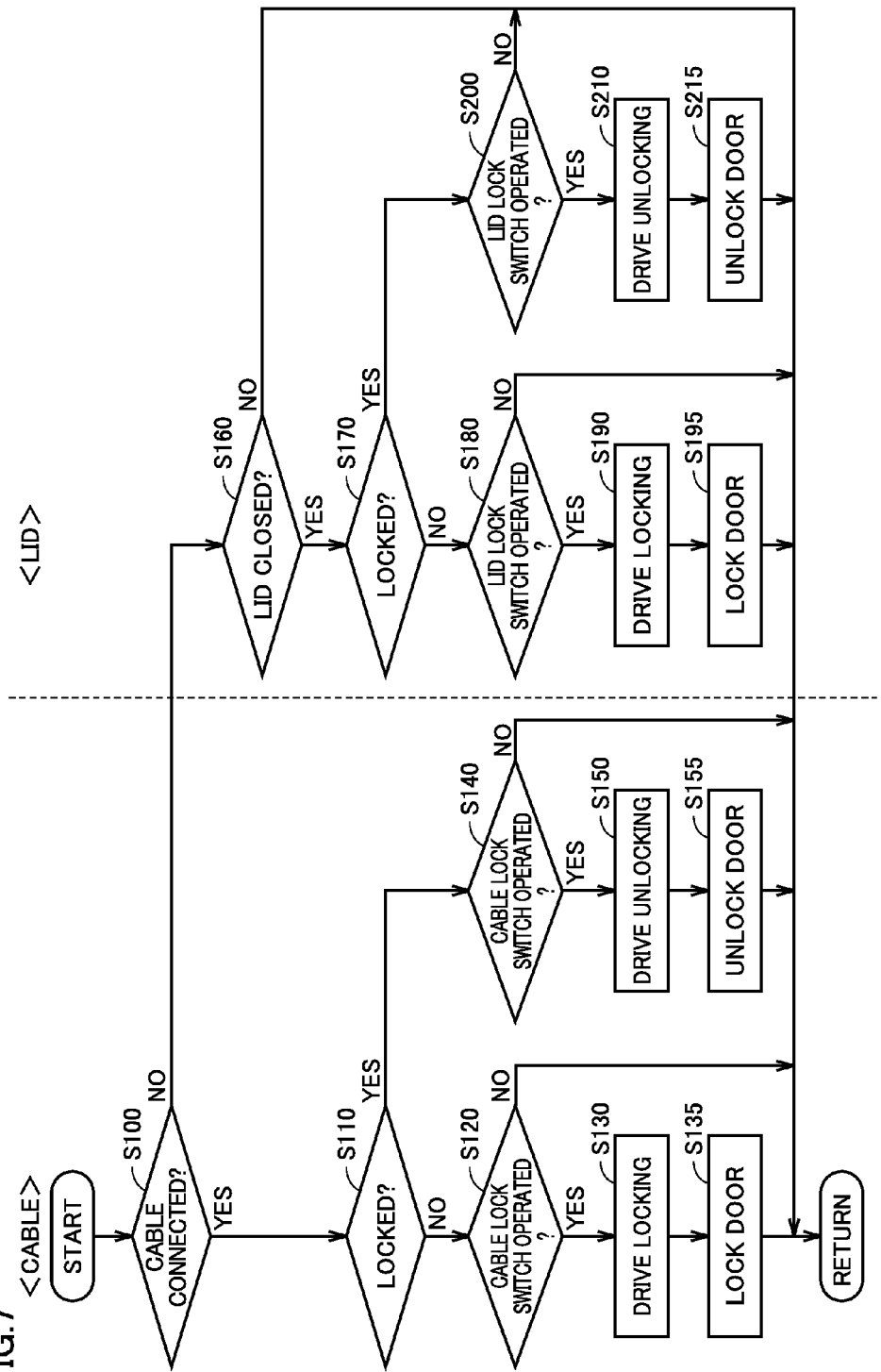
FIG. 7 is a flowchart of a process of a lock control performed by an ECU of a vehicle according to a second embodiment.

FIG. 7 is a flowchart of a process of a lock control performed by an ECU 300A of a vehicle according to the second embodiment. With reference to FIG. 7, S100-S130, S140-S150, S160-S190, and S200-S210 are similar to the first embodiment, and accordingly, will not be described repeatedly.

In S130 when lock units 410, 420 are driven to be locked, ECU 300A controls drive device 430 to drive the door lock unit to a door locked state (S135). Similarly in S190 when lock units 410, 420 are driven to be locked, ECU 300A controls drive device 430 to drive the door lock unit to the door locked state (S 195).

In contrast, in S150 when lock units 410, 420 are driven to be unlocked, ECU 300A controls drive device 430 to drive the door lock unit to a door unlocked state (S155). Similarly in S210 when lock units 410, 420 are driven to be unlocked, ECU 300A controls drive device 430 to drive the door lock unit to the door unlocked state (S215).

Thus in the second embodiment the door lock unit is driven to operate as lock units 410, 420 operate. This dispenses with an operation for operating the door lock unit when power cable 620 is taken into and out of a vehicular compartment of vehicle 100. The second embodiment can thus improve the user's convenience.

Third Embodiment

A third embodiment is described for an example with lock units 410, 420 operating in response to whether smart key 530 is detected.

Figure 8:
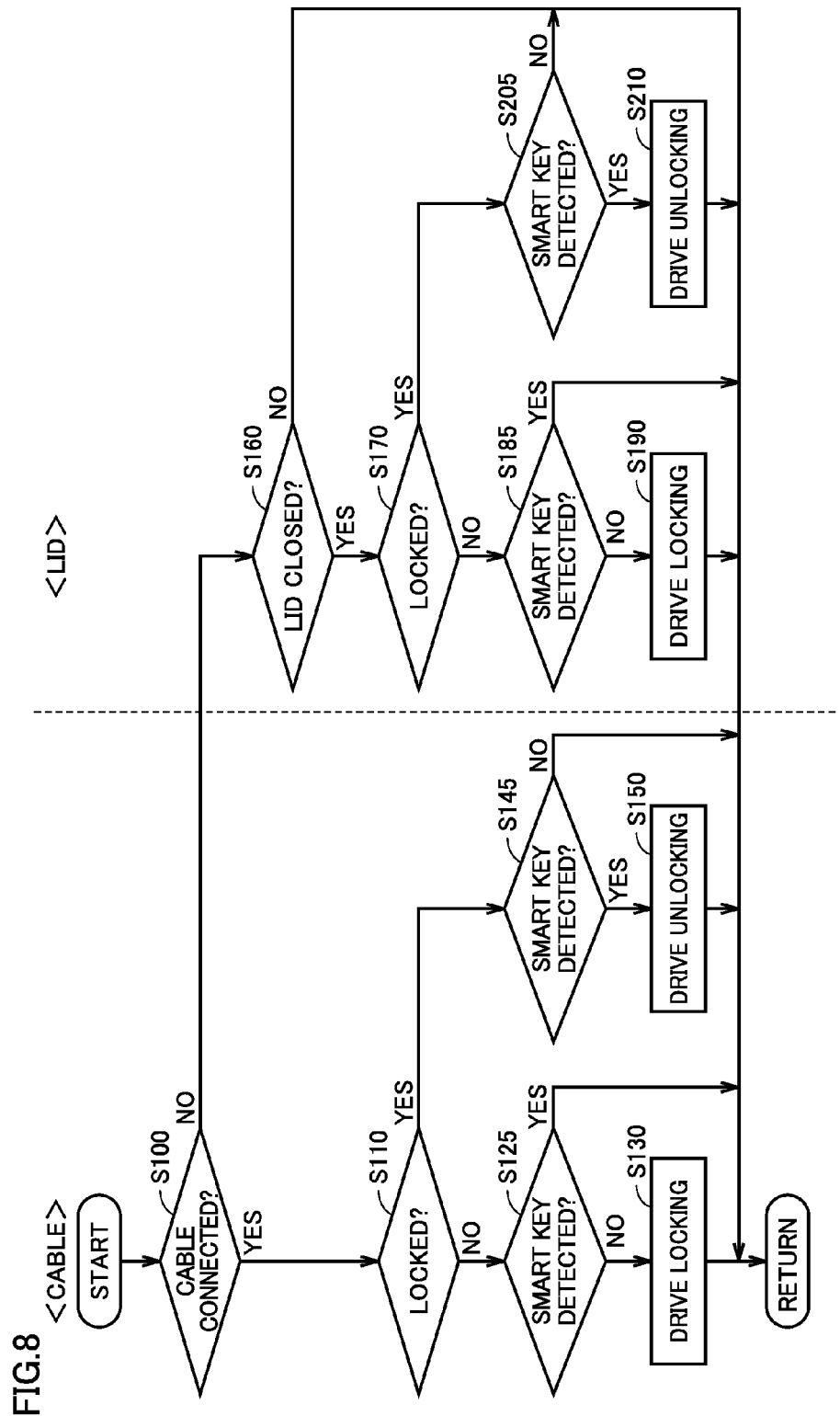
FIG. 8 is a flowchart of a process of a lock control performed by an ECU of a vehicle according to a third embodiment.

FIG. 8 is a flowchart of a process of a lock control performed by an ECU 300B of a vehicle according to the third embodiment. With reference to FIG. 8, S100-S120, S130, S150, S160-S170, S190, and S210 are similar to the first embodiment, and accordingly, will not be described repeatedly.

In S110 when ECU 300B determines that lock unit 410 is in the unlocked state (NO in S110) ECU 300B determines whether smart key 530 is detected (S125). When ECU 300B determines that smart key 530 is detected (YES in S125), ECU 300B does not perform the subsequent step(s) and returns to the main routine. When ECU 300B determines that smart key 530 is not detected (NO in S125), ECU 300B generates a signal driving both lock units 410 and 420 to the locked state, and outputs the generated signal to drive circuit 440 (S130).

In contrast, in S110 when ECU 300B determines that lock unit 410 is in the locked state (YES in 5110) ECU 300B determines whether smart key 530 is detected (S145). When ECU 300B determines that smart key 530 is detected (YES in S145), ECU 300B generates a signal driving both lock units 410 and 420 to the unlocked state, and outputs the generated signal to drive circuit 440 (S150). When ECU 300B determines that smart key 530 is not detected (NO in S145), ECU 300B does not perform the subsequent step(s) and returns to the main routine.

In S170 when ECU 300B determines that lock unit 420 is in the unlocked state (NO in S170) ECU 300B determines whether smart key 530 is detected (S185). When ECU 300B determines that smart key 530 is detected (YES in S185), ECU 300B does not perform the subsequent step(s) and returns to the main routine. When ECU 300B determines that smart key 530 is not detected (NO in S185), ECU 300B generates a signal driving both lock units 410 and 420 to the locked state, and outputs the generated signal to drive circuit 440 (S190).

In contrast, in S170 when ECU 300B determines that lock unit 420 is in the locked state (YES in S170) ECU 300B determines whether smart key 530 is detected (S205). When ECU 300B determines that smart key 530 is detected (YES in S205), ECU 300B generates a signal driving both lock units 410 and 420 to the unlocked state, and outputs the generated signal to drive circuit 440 (S210). When ECU 300B determines that smart key 530 is not detected (NO in S205), ECU 300B does not perform the subsequent step(s) and returns to the main routine.

Thus in the third embodiment lock units 410, 420 are driven to operate in response to whether smart key 530 is detected. This allows the user to operate lock units 410 and 420 without operating cable lock switch 481 or lid lock switch 482. The third embodiment can thus improve the user's convenience.

Fourth Embodiment

The first embodiment has been described for an example with lock units 410, 420 driven via a common drive circuit 440. A fourth embodiment will be described for an example with lock units 410, 420 that are driven via the common drive circuit further driven by a common actuator.

Figure 9:
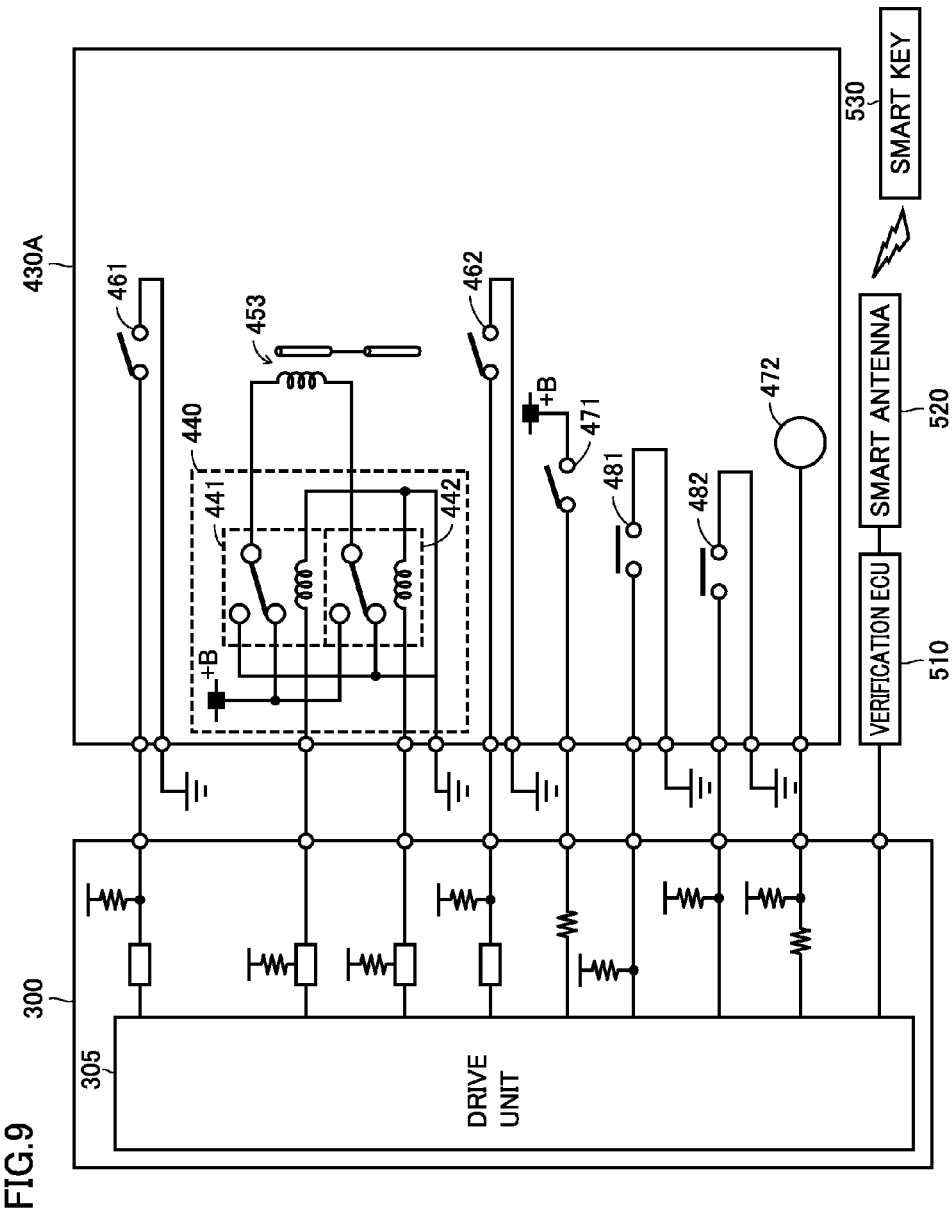
FIG. 9 shows a configuration of a drive device of a lock device according to a fourth embodiment.

FIG. 9 shows a configuration of a drive device 430A of a lock device 400A according to the fourth embodiment. Those components in FIG. 9 that are also shown in FIG. 4 will not be described repeatedly.

With reference to FIG. 9, when drive device 430A is compared with drive device 430 shown in FIG. 4, the former is provided with an actuator 453, rather than actuators 451, 452.

Actuator 453 is an actuator for driving both lock units 410 and 420. Actuator 453 is for example a motor and provides a driving force to both lock units 410 and 420. Note that actuator 453 may be a solenoid.

More specifically, actuator 453 has a movable part mechanically coupled with both lock units 410 and 420. Accordingly, when the movable part of actuator 453 operates, both lock units 410 and 420 also accordingly operate. Note that actuator 453 may have a link mechanism for providing a driving force to both lock units 410 and 420.

Thus, in the fourth embodiment, drive circuit 440 is shared and in addition actuator 453 is shared. The fourth embodiment thus allows lock units 410, 420 to be driven via drive device 430 that is further simplified to achieve a reduced cost.

Note that while the above embodiments have been described for a hybrid vehicle having engine 160 and motor generators 130, 135 mounted therein, the present invention is not limited in application to the hybrid vehicle and may be applied to electric vehicles, fuel-cell vehicles and the like.

Note that while in the above description power conversion device 200 operates to charge power storage device 110 with electric power received from external power supply 600, power conversion device 200 may be configured to provide electric power conversion to output the electric power of power storage device 110 to outside vehicle 100 via connection unit 220.

Note that in the above, lock unit 410 corresponds to one embodiment of a "first lock unit" in the present invention, and lock unit 420 corresponds to one embodiment of a "second lock unit" in the present invention. Furthermore, cable lock switch 481 corresponds to one embodiment of a "first operation unit" in the present invention, and lid lock switch 482 corresponds to one embodiment of a "second operation unit" in the present invention.

While the present invention has thus been described in embodiments, the embodiments may be combined in configuration, as appropriate.

It should be understood that the embodiments disclosed herein have been described for the purpose of illustration only and in a non-restrictive manner in any respect. The scope of the present invention is defined by the terms of the claims, rather than the description above, and is intended to include any modifications within the scope and meaning equivalent to the terms of the claims.

REFERENCE SIGNS LIST

100: vehicle; 110: power storage device; 121: converter; 122, 123: inverter; 130, 135: motor generator; 140: driving power transmission gear; 150: driving wheel; 160: engine; 200: power conversion device; 220: connection unit; 230: lid; 305: drive unit; 310: detection unit; 320: determination unit; 330: control unit; 400, 400A: lock device; 410, 420: lock unit; 430, 430A: drive device; 440: drive circuit; 441, 442: relay; 451-453: actuator; 461: unlocked state detection switch; 462: locked state detection switch; 471: lid open/closed detection switch; 472: cable connection detection switch; 481: cable locking operation switch; 482: lid locking operation switch; 520: smart antenna; 530: smart key; 600: external power supply; 610: connector; 620: power cable; C1, C2: capacitor; 510: verification ECU.

The invention claimed is:

1. A vehicle comprising:
   a connection unit configured to connect a power cable;
   a lid of said connection unit;
   a first lock unit configured to lock connection between said connection unit and said power cable;
   a second lock unit configured to lock said lid to a closed state;
   a drive device configured to drive both said first and second lock units to a locked state when at least one of first and second conditions is established, said first condition permitting said first lock unit to be locked, said second condition permitting said second lock unit to be locked;
   a first operation unit configured to allow a user to operate said first lock unit; and
   a second operation unit configured to allow the user to operate said second lock unit wherein:
   said first condition is established when said power cable is connected to said connection unit, said first lock unit is unlocked and said first operation unit is operated; and
   said second condition is established when said power cable is disconnected from said connection unit, said lid is in the closed state, said second lock unit is unlocked, and said second operation unit is operated.

2. The vehicle according to claim 1, wherein said drive device includes:
   a first actuator configured to operate said first lock unit;
   a second actuator configured to operate said second lock unit; and
   a drive circuit configured to drive said first and second actuators.

3. The vehicle according to claim 1, wherein:
   said first and second lock units are configured to be mechanically ganged; and said drive device includes an actuator configured to operate said first and second lock units, and a drive circuit configured to drive said actuator.

4. The vehicle according to claim 1, wherein said drive device is configured to drive both said first and second lock units to an unlocked state when at least one of third and fourth conditions is established, said third condition allowing said first lock unit to be unlocked, said fourth condition allowing said second lock unit to be unlocked.

5. The vehicle according to claim 4, wherein:
   said third condition is established when said power cable is connected to said connection unit, said first lock unit is locked and said first operation unit is operated; and
   said fourth condition is established when said power cable is disconnected from said connection unit, said lid is in the closed state, said second lock unit is locked, and said second operation unit is operated.

6. The vehicle according to claim 1, further comprising a third lock unit configured to lock a door of the vehicle to a closed state, wherein when said drive device drives both said first and second lock units said drive device drives said third lock unit.

7. The vehicle according to claim 1, further comprising a communication device configured to communicate with a communication terminal carried by a user, wherein when said communication device detects a signal issued from said communication terminal said drive device drives both said first and second lock units.

* * * * *